United States Patent [19]

Marino et al.

[11] Patent Number: 4,502,324

[45] Date of Patent: Mar. 5, 1985

[54] ENGINE ANALYZER POWER CHECK APPARATUS

[75] Inventors: Joseph A. Marino, Waukesha; Michael J. Kling, Mequon, both of Wis.; Sydney J. Roth, Largo, Fla.

[73] Assignee: Bear Automotive Service Equipment Company, Milwaukee, Wis.

[21] Appl. No.: 441,425

[22] Filed: Nov. 15, 1982

[51] Int. Cl.$^3$ .................. G01M 19/02; G01M 15/00
[52] U.S. Cl. .......................... 73/117.3; 364/431.12
[58] Field of Search ............... 364/431.01, 431.03, 364/431.09, 431.08, 431.12; 73/116, 117.2, 117.3; 324/379, 116

[56] References Cited

U.S. PATENT DOCUMENTS

| Re. 29,810 | 10/1978 | Marino | 73/117.3 |
| Re. 29,984 | 5/1979 | Howes | 73/117.3 |
| 3,572,103 | 3/1971 | Marino | |
| 3,573,608 | 4/1971 | Marino et al. | |
| 4,267,569 | 5/1981 | Baumann | 324/379 X |
| 4,408,296 | 10/1983 | Robbi | 364/431.12 X |

Primary Examiner—Stanley T. Krawczewicz
Assistant Examiner—Jose M. Solis
Attorney, Agent, or Firm—Kinney & Lange

[57] ABSTRACT

An engine analyzer tests operation of a multicylinder internal combustion engine by disabling selected cylinders. The apparatus includes a semiconductor switch connected in parallel with the ignition points (or solid state circuit interrupter) of the engine's ignition system. A cylinder clock signal is derived from the engine, and exhibits a first signal transition each time the points open. A cylinder counter maintains a cylinder count identifying the current cylinder, and a period measurement timer measures the time period for each cylinder based upon the time between each first signal transition of the cylinder clock signal. The previously measured time periods of the cylinders are stored in a table which is constantly updated. Each time a first signal transition occurs, a programmable time delay timer is loaded with an input value which is based upon a previously measured time period for the current cylinder. The time delay is shorter than the previously measured time period, so that the time delay ends before the first signal transition corresponding to the next cylinder in sequence. An enable/disable table is stored which indicates which cylinders are to be disabled. If the next cylinder in the sequence is to be disabled, the switch is switched from a nonconductive to a conductive state so as to short circuit the points to prevent generation of a secondary voltage for the ignitier corresponding to the next cylinder.

9 Claims, 10 Drawing Figures

ENGINE ANALYZER POWER CHECK APPARATUS

CROSS-REFERENCE TO RELATED APPLICATIONS

Reference is hereby made to the following copending applications, all of which are assigned to the same assignee as the present application: ENGINE ANALYZER WITH DIGITAL WAVEFORM DISPLAY, J. Marino, M. Kling and S. Roth, Ser. No. 327,734, filed Dec. 4, 1981, now U.S. Pat. No. 4,476,531; ENGINE ANALYZER WITH CONSTANT WIDTH DIGITAL WAVEFORM DISPLAY, J. Marino, M. Kling and S. Roth, Ser. No. 327,511, filed Dec. 4, 1981, now U.S. Pat. No. 4,399,407; ENGINE ANALYZER WITH SIMULATED ANALOG METER DISPLAY, M. Kling and J. Marino, Ser. No. 327,734, filed Dec. 4, 1981; IGNITION COIL TEST APPARATUS, J. Marino, M. Kling, S. Roth and S. Makhija, Ser. No. 327,733, filed Dec. 4, 1981; ENGINE TIMING APPARATUS FOR USE IN TESTING, J. Marino, M. Kling and S. Roth, Ser. No. 327,497, filed Dec. 4, 1981; and COMPUTER BASED ENGINE ANALYZER WITH HARDWARE CYLINDER COUNTER, M. Kling, Ser. No. 330,151, filed Dec. 10, 1981, now U.S. Pat. No. 4,425,791.

BACKGROUND OF THE INVENTION

1. Field of the Invention

The present invention relates to engine analyzer apparatus used for testing internal combustion engines. In particular, the present invention relates to apparatus for measuring the internal combustion engine by selectively disabling cylinders while the engine is running.

2. Description of the Prior Art

An internal combustion engine used to power automobiles, trucks, and other land vehicles typically has several cylinders, and has an ignition system which includes a battery, an ignition coil, a condensor, a circuit interrupter (either breaker points or a solid state switching device), a distributor, and spark plugs for each of the cylinders. As the engine runs, the circuit interrupter periodically interrupts current flow through the primary winding of the ignition coil, thus inducing a high voltage output pulse which is supplied by the distributor to one of the spark plugs.

This type of ignition system requires periodic testing and maintenance in order to obtain the desired performance from the engine. One type of test which has been used is sometimes referred to as "Power Check", and involves the shorting out of selected spark plugs and observing the change in rpm of the engine.

The power check test requires a circuit which keeps track of cylinder number and shorts out the circuit interrupter before it opens to interrupt current flow and produce an output pulse to the selected spark plug. U.S. Pat. Nos. 3,572,103 and 3,573,608 describe power check circuitry which utilizes a ring counter and a pulse generating circuit for firing an SCR which shorts out the breaker points.

One difficult technical problem encountered with power check test circuitry is the proper timing of the power check pulse so that it begins before the circuit interrupter opens (i.e. the cylinder fires) and ends after the circuit interrupter closes. This is complicated by instantaneous speed fluctuations of the engine which result in different times between firing of different cylinders.

There is a continuing need for improved power check test circuitry which accurately generates power check pulses having the desired time relationship to the firing of a selected cylinder. In addition, there is a need for improved power check test circuitry which is capable of selectively shorting out individual spark plugs or groups of spark plugs in predetermined patterns.

SUMMARY OF THE INVENTION

The present invention is an improved test apparatus for testing operation of a multicylinder internal combustion engine by selectively disabling cylinders of the engine while it is running. The engine being tested is of a type which has an ignition circuit including an igniter for each cylinder, an ignition coil, circuit interrupter means, and a distributor. The circuit interrupter means is periodically switched between a conductive and a nonconductive state to cause the ignition coil to generate a secondary voltage each time the circuit interrupter is switched to the nonconductive state. The distributor applies each generated secondary voltage signal to the igniter of a different cylinder in a predetermined sequence. A selected cylinder is disabled by the test apparatus by selectively short circuiting the circuit interrupter means.

The test apparatus includes switching means for switching from a nonconductive to a conductive state in response to a switch control signal. The switching means is operatively connected across the circuit interrupter means of the engine to cause the circuit interrupter means to be short circuited each time the switching means is in its conductive state.

Cylinder clock means derives a cylinder clock signal from the engine which is representative of the sequential operation of the cylinders of the engine. The cylinder clock signal exhibits a first signal transition each time the circuit interrupter means switches from its conductive to its nonconductive state.

Cylinder counter means respond to the cylinder clock signal and provides a cylinder count signal which identifies the current cylinder in the sequence of operation of the engine. Period measurement means measures a time period for each cylinder based upon the cylinder clock signal. Previously measured time periods of the cylinders are stored.

Programmable time delay means provides a time delay which is initiated in response to each first signal transition of the cylinder clock signal. The duration of the time delay is shorter than the stored previously measured time period of the current cylinder, so the time delay ends before the first signal transition corresponding to the next cylinder in the sequence.

The test apparatus includes means for storing an indication for each cylinder of whether that cylinder is to be disabled. At the end of the time delay, the switch control signal is produced if the next cylinder in the sequence is to be disabled. The determination of whether the switch control signal is provided at the end of the time delay is based upon the cylinder count signal and the stored indication of whether the next cylinder is to be disabled.

Figure 1:
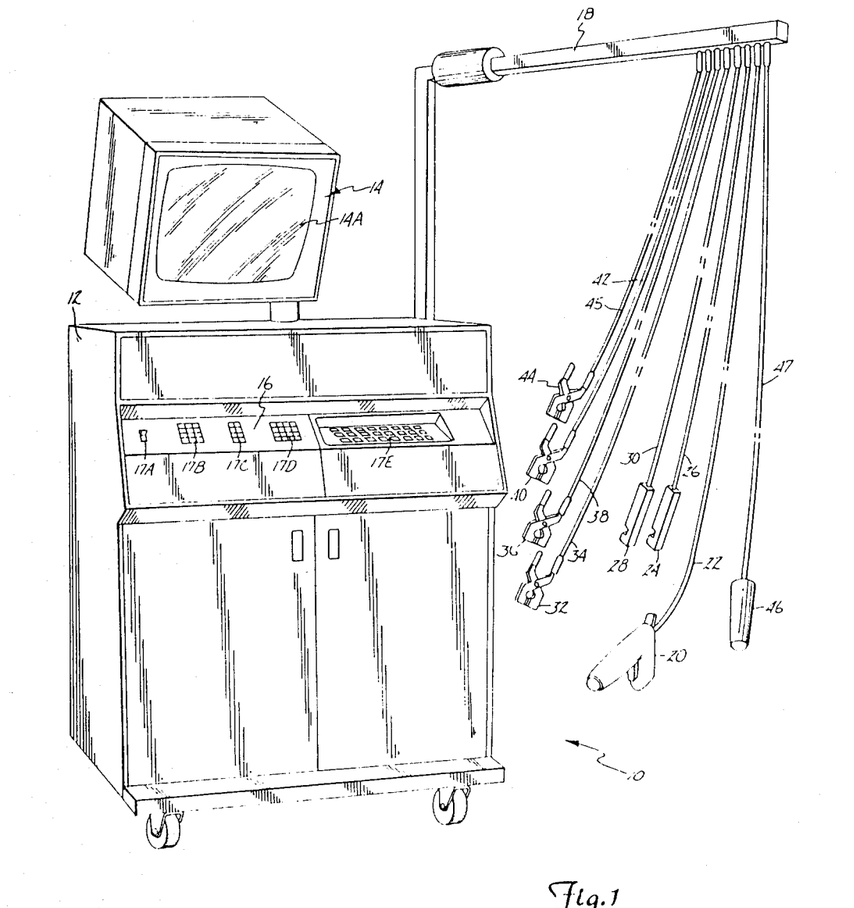
FIG. 1 is a perspective view showing an engine analyzer apparatus which utilizes the present invention.
Figure 2:
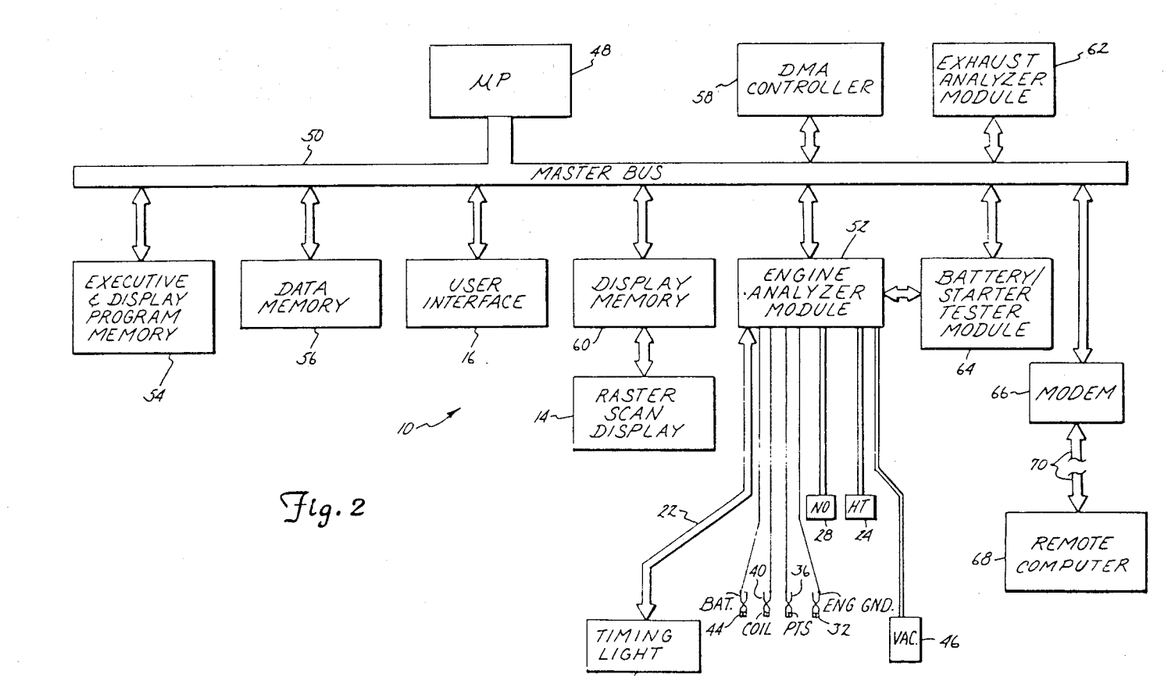
FIG. 2 is an electrical block diagram of the engine analyzer apparatus of FIG. 1.

DETAILED DESCRIPTION OF THE PREFERRED EMBODIMENTS (1) General System Description (FIGS. 1 and 2)

In preferred embodiments of the present invention, the power check test apparatus of the present invention is a part of a multi-function engine analyzer apparatus such as engine analyzer 10 shown in FIG. 1, which performs various ignition system tests. For that reason, the present invention will include some description of various devices and components which form a part of engine analyzer 10, although those devices and components do not form a part of the present invention.

As shown in FIG. 1, mounted at the front of housing 12 of analyzer 10 are cathode ray tube (CRT) raster scan display 14 and user interface 16, which is preferably a control panel having a plurality of control switches 17A–17D, as well as a keyboard 17E for entering numerical information. Extending from boom 18 are a plurality of cables which are electrically connected to the circuitry within housing 12, and which are intended for use during operation of the analyzer 10. Timing light 20 is connected at the end of multiconductor cable 22. "High Tension" (HT) probe 24 is connected at the end of multiconductor cable 26, and is used for sensing secondary voltage of the ignition system of an internal combustion engine of a vehicle (not shown). "No. 1" probe 28 is connected to the end of multiconductor cable 30, and is used to sense the electrical signal being supplied to the No. 1 sparkplug of the ignition system. "Engine Ground" connector 32, which is preferably an alligator-type clamp, is connected at the end of cable 34, and is typically connected to the ground terminal of the battery of the ignition system. "Points" connector 36, which is preferably an alligator-type clamp, is attached to the end of cable 38 and is intended to be connected to one of the primary winding terminals of an ignition coil of the ignition system. "Coil" connector 40, which is preferably an alligator-type clamp attached to the end of cable 42, is intended to be connected to the other primary winding terminal of the ignition coil. "Battery" connector 44, which is preferably an alligator-type clamp, is attached to the end of cable 45. Battery connector 44 is connected to the "hot" or "non-ground" terminal of the battery of the ignition system. Vacuum transducer 46 at the end of multiconductor cable 47 produces an electrical signal which is a linear function of vacuum or pressure, such as intake manifold vacuum or pressure.

FIG. 2 is an electrical block diagram showing engine analyzer 10 of the present invention. Operation of engine analyzer 10 is controlled by microprocessor 48, which communicates with the various subsystems of engine analyzer 10 by means of master bus 50. In the preferred embodiments of the present invention, master bus 50 is made up of fifty-six lines, which form a data bus, an address bus, a control bus, and a power bus.

Timing light 20, HT probe 24, No. 1 probe 28, Engine Ground connector 32, Points connector 36, Coil connector 40, Battery connector 44, and vacuum transducer 46 interface with the electrical system of engine analyzer 10 through engine analyzer module 52. As described in further detail later, engine analyzer module 52 includes a digital section and an analog section. Input signal processing is performed in the analog section, and the input analog signals received are converted to digital data. The digital section of engine analyzer module 52 interfaces with master bus 50.

Control of the engine analyzer system 10 by microprocessor 48 is based upon a stored program in engine analyzer module 52 and a stored program in executive and display program memory 54, (which interfaces with master bus 50). Digitized waveforms produced, for example, by engine analyzer module 52 are stored in data memory 56. The transfer of digitized waveforms from engine analyzer module 52 to data memory 56 is provided by direct memory access (DMA) controller 58.

User interface 16 interfaces with master bus 50 and preferably includes switches 17A–17D and a keyboard 17E through which the operator can enter data and select particular tests to be performed.

As further illustrated in FIG. 2, engine analyzer 10 has the capability of expansion to perform other engine test functions by adding other test modules. These modules can include, for example, exhaust analyzer module 62 and battery/starter tester module 64. Both modules 62 and 64 interface with the remaining system of analyzer 10 through master bus 50 and provide digital data or digitized waveforms based upon the particular tests performed by those modules. In the preferred embodiments shown in FIG. 2, modulator/demodulator (MODEM) 66 also interfaces with master bus 50, to permit analyzer 10 to interface with remote computer 68 through communication link 70. This is a particularly advantageous feature, since remote computer 68 typically has greater data storage and computational capabilities than are present within analyzer 10.

Figure 3:
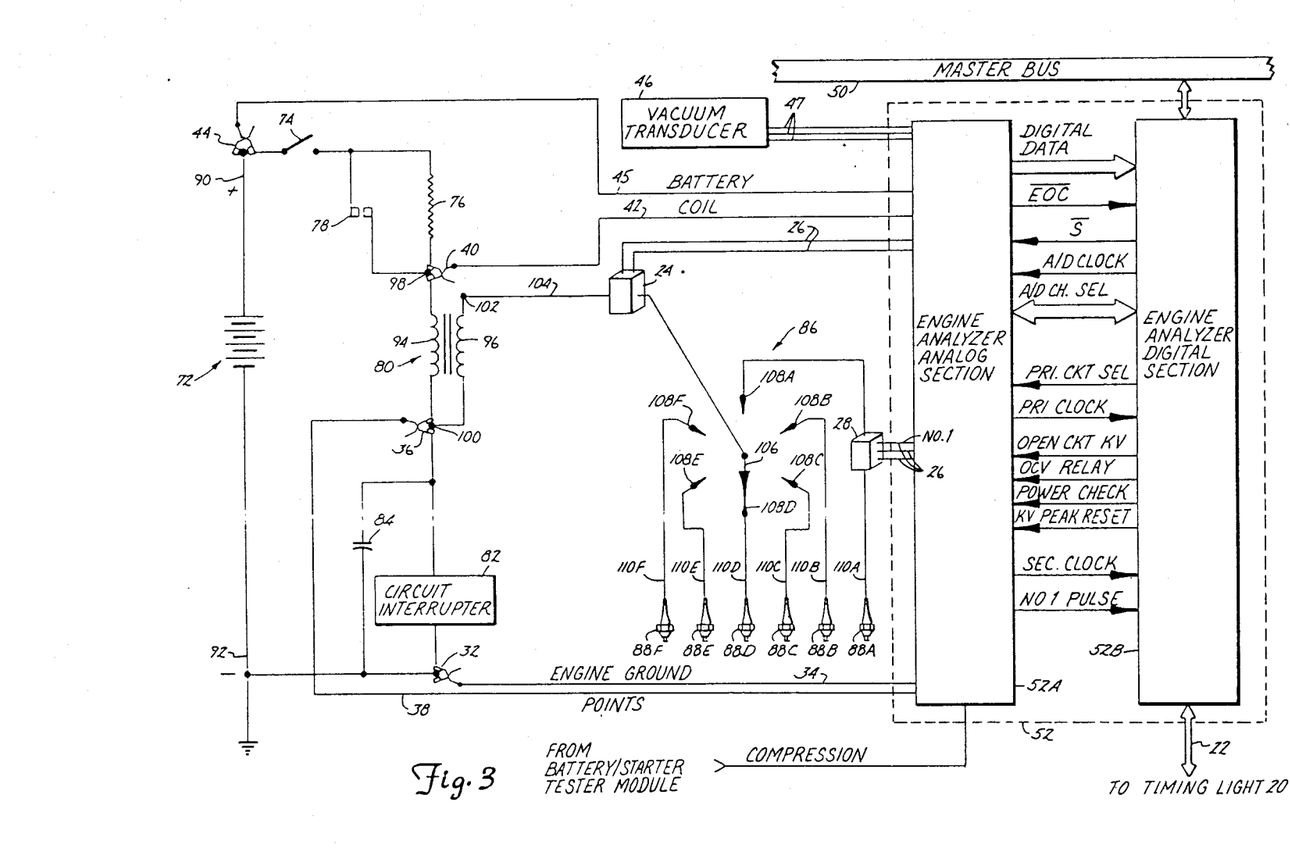
FIG. 3 shows the engine analyzer module of the apparatus of FIG. 2 in electrical schematic form in connection with a conventional ignition system of an internal combustion engine.

(2) Engine Analyzer 52 (Figure 3)

FIG. 3 shows engine analyzer 52 connected to a vehicle ignition system, which is schematically illustrated. The ignition system includes battery 72, ignition switch 74, ballast resistor 76, relay contacts 78, ignition coil 80, circuit interrupter 82, condensor 84, distributor 86, and igniters 88A–88F. The particular ignition system shown in FIG. 3 is for a six-cylinder internal combustion engine. Engine analyzer 10 of the present invention may be used with a wide variety of different engines having different numbers of cylinders. The six-cylinder ignition system shown in FIG. 3 is strictly for the purpose of example.

In FIG. 3, battery 72 has its positive (+) terminal 90 conected to one terminal of ignition switch 74, and its negative (−) terminal 92 connected to engine ground.

Ignition switch 74 is connected in a series current path with ballast resistor 76, primary winding 94 of ignition coil 80, and circuit interrupter 82 between positive terminal 90 and engine ground (i.e. negative terminal 92). Relay contacts 78 are connected in parallel with ballast resistor 76, and are normally open during operation of the engine. Relay contacts 78 are closed during starting of the engine by a relay coil associated with the starter/cranking system (not shown) so as to short out ballast resistor 76 and thus reduce resistance in the series current path during starting of the engine.

Condensor 84 is connected in parallel with circuit interrupter 82, and is the conventional capacitor used in ignition systems. Circuit interrupter 82 is, for example, conventional breaker points operated by a cam associated with distributor 86, or is a solid state switching element in the case of solid state ignition systems now available in various automobiles. In subsequent discussion in this specification the term "points" is used as a label for certain signals and in describing the switching of circuit interrupter 82 to a non-conductive state (i.e. "points open") and the switching of circuit interrupter 82 to a conductive state (i.e. "points closed"). This usage of the term "points" is for convenience only and does not imply the particular construction of circuit interrupter 82.

As shown in FIG. 3, ignition coil 80 has three terminals 98, 100, and 102. Low voltage primary winding 94 is connected between terminals 98 and 100. Terminal 98 is connected to ballast resistor 76, while terminal 100 is connected to circuit interrupter 82. High voltage secondary winding 96 of ignition coil 80 is connected between terminal 100 and terminal 102. High tension wire 104 connects terminal 102 of coil 80 to distributor arm 106 of distributor 86. Distributor arm 106 is driven by the engine and sequentially makes contact with terminals 108A–108F of distributor 86. Wires 110A–110F connect terminals 108A–108F with igniters 88A–88F, respectively. Igniters 88A–88F normally take the form of conventional spark plugs. While igniters 88A–88F are shown in FIG. 3 as located in a continuous row, it will be understood that they are associated with the cylinders of the engine in such a manner as to produce the desired firing sequence. Upon rotation of distributor arm 106, voltage induced in secondary winding 96 of ignition coil 80 is successively applied to the various igniters 88A–88F in the desired firing sequence.

As shown in FIG. 3, engine analyzer 10 interfaces with the engine ignition system through engine analyzer module 52, which includes engine analyzer analog section 52A and engine analyzer digital section 52B. Input signals are derived from the ignition system by means of Engine Ground connector 32, Points connector 36, Coil connector 40, Battery connector 44, HT secondary voltage probe 24, and No. 1 probe 28. In addition, a vacuum/pressure electrical input signal is produced by vacuum transducer 46, and a COMPRESSION input signal (derived from starter current) is produced by battery/starter tester module 64. These input signals are received by engine analyzer analog section 52A and are converted to digital signals which are then supplied to engine analyzer digital section 52B. Communication between engine analyzer module 52 and microprocessor 48, data memory 56, and DMA controller 58 is provided by engine analyzer digital section 52B through master bus 50. In addition, engine analyzer digital section 52B interfaces with timing light 20 through cable 22.

As illustrated in FIG. 3, Engine Ground connector 32 is connected to negative terminal 92 of battery 72, or other suitable ground on the engine. Points connector 36 is connected to terminal 100 of ignition coil 80, which in turn is connected to circuit interrupter 82. As discussed previously, circuit interrupter 82 may be conventional breaker points or a solid state switching device of a solid state ignition system. Coil connector 40 is connected to terminal 98 of ignition coil 80, and Battery connector 44 is connected to positive terminal 90 of battery 72. All four connectors 32, 36, 40 and 44 are, therefore, connected to readily accessible terminals of the ignition system, and do not require removal of conductors in order to make connections to the ignition system.

HT probe 24 is a conventional probe used to sense secondary voltage by sensing current flow through conductor 104. Similarly, No. 1 probe 28 is a conventional probe used to sense current flow through wire 110A. In the example shown in FIG. 3, igniter 88A has been designated as the igniter for the "No. 1" cylinder of the engine. Both probe 24 and probe 28 merely clamp around existing conductors, and thus do not require removal of conductors in order to make measurements.

Figure 4:
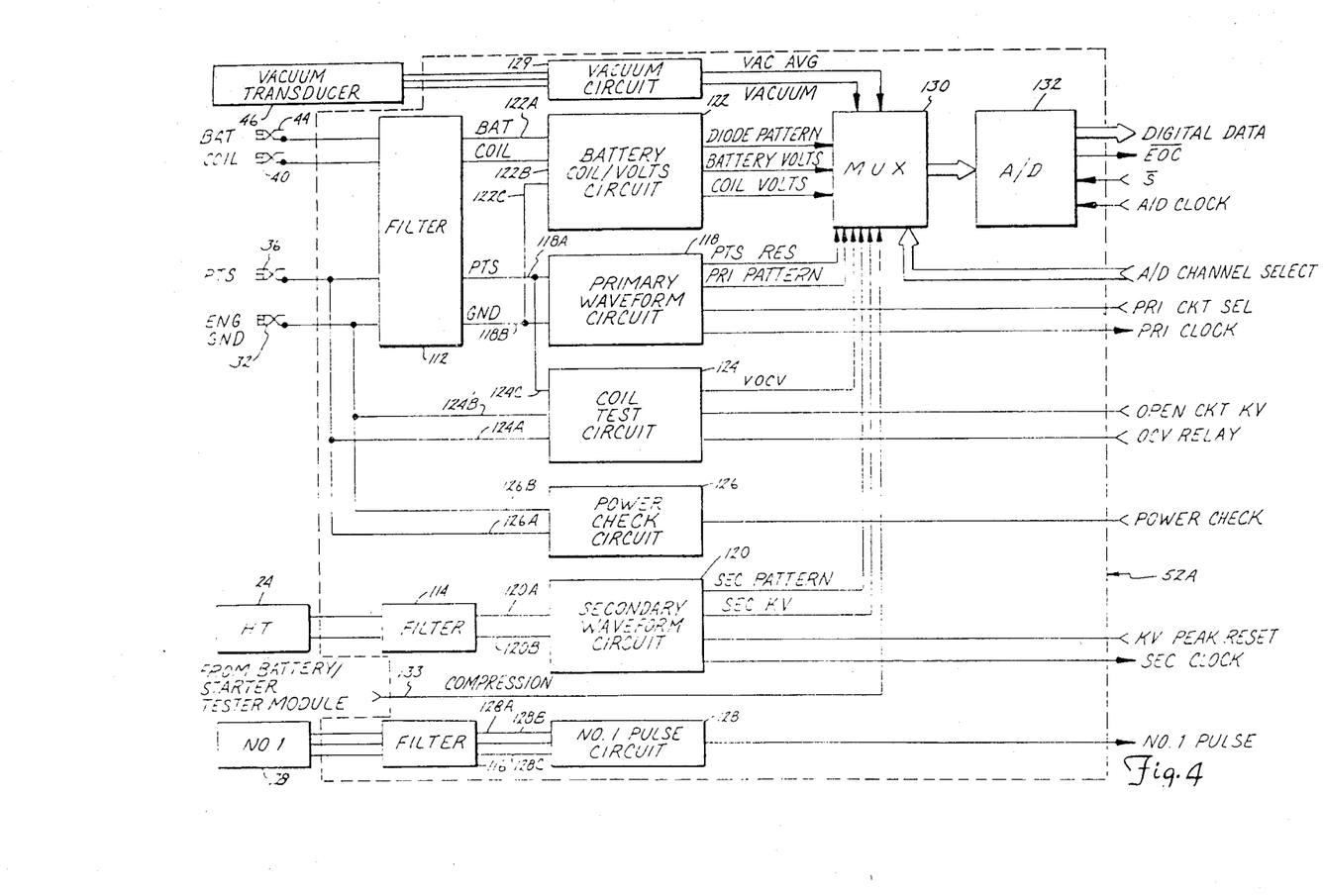
FIG. 4 is an electrical block diagram of the analog section of the engine analyzer module of FIG. 3.

(3) Engine Analyzer Analog Section 53A (Figure 4)

FIG. 4 is an electrical block diagram showing engine analyzer analog section 52A, together with HT probe 24, No. 1 probe 28, Engine Ground connector 32, Points connector 36, Coil connector 40, Battery connector 44, and vacuum transducer 46. Analgo section 52A includes input filters 112, 114, and 116, primary waveform circuit 118, secondary waveform circuit 120, battery coil/volts circuit 122, coil test circuit 124, power check circuit 126, No. 1 pulse circuit 128, vacuum circuit 129, multiplexer (MUX) 130, and analog-to-digital (A/D) converter 132. Analog section 52A supplies digital data, an end-of-conversion signal (EOC), a primary clock signal (PRI CLOCK), a secondary clock signal (SEC CLOCK), and a No. 1 PULSE signal to engine analyzer digital section 52B. Analog section 52A receives an S singal, an A/D CLOCK signal, A/D CHANNEL SELECT signals, a primary circuit select signal (PRI CKT SEL), a coil test gating signal (OPEN CKT KV), an OCV RELAY signal, a POWER CHECK signal and a KV PEAK RESET signal from engine analyzer digital section 52B.

For the purposes of the power check test of the present invention, only primary waveform circuit 118 (or secondary waveform circuit 120), power check circuit 126, and No. 1 pulse circuit 128 are involved in testing of the engine. A detailed description of the other circuitry of analog section 52A may be found in the previously mentioned U.S. Pat. No. 4,399,407.

Points connector 36 and Engine Ground connector 32 are connected through filter circuit 112 to inputs 118A and 118B, respectively, of primary waveform circuit 118. Filter circuits 112, 114 and 116 are preferably inductive-capacitive filters which filter input signals to suppress or minimize the high frequency noise signals typically generated by the ignition system. Based upon the signal appearing at its inputs, 118A and 118B, primary waveform circuit 118 supplies a primary clock (PRI CLOCK) signal to digital section 52B, and also provides a primary pattern (PRI PATTERN) waveform and a points resistance (PTS RES) signal to multiplexer 130.

The primary clock (PRI CLOCK) signal is a filtered signal that is 180° out of phase with the primary signal appearing between Points connector 36 and Engine Ground connector 32. The PRI CLOCK signal is a square wave signal that is high during the time period when the circuit interrupter 82 is conductive and is low during the time when circuit interrupter 82 is non-conductive. In preferred embodiments of the present invention, primary waveform circuit 118 amplifies the primary signal appearing between Points connector 36 and Engine Ground connector 32, filters the amplified signal, and compares the amplified and filtered signal to a reference or threshold voltage. This reference or threshold voltage has two levels, which are selectable by the PRI CKT SEL signal supplied by digital section 52B. The PRI CKT SEL signal causes primary waveform circuit 118 to use one threshold voltage level when conventional breaker points are used as circuit interrupter 82, and a second threshold voltage when circuit interrupter 82 is a solid state type of circuit interrupter (such as a General Motors HEI solid state ignition system).

In preferred embodiments of the present invention, primary waveform circuit 118 includes circuitry to invert the primary ignition signal in the event that the primary ignition signal is a negative going signal, which occurs with vehicles equipped with the battery positive terminal at engine ground. As a result, the PRI CLOCK signal produced by primary waveform circuit 118 is unchanged, regardless of whether the vehicle has a positive or negative ground.

The secondary voltage sensed by HT probe 24 is supplied through filter 114 to inputs 120A and 120B of secondary waveform circuit 120. The secondary voltage is reduced by a capacitive divider by a factor of 10,000, is supplied through a protective circuit which provides protection against intermittent high voltage spikes, and is introduced to three separate circuits. One circuit supplies the SEC CLOCK signal; a second circuit supplies a secondary pattern (SEC PATTERN) waveform to multiplexer 130, and a third circuit supplies the SEC KV signal to multiplexer 130.

The SEC CLOCK signal is a negative going signal which occurs once for each secondary ignition signal pulse, and has a duration of approximately 1 millisecond. The inverted secondary voltage signal is amplified and is used to drive two cascaded one-shot multivibrators (not shown).

The signal from No. 1 voltage probe 28 is supplied through inductive-capacitive type filter 116 to inputs 128A–128C of No. 1 pulse circuit 128, where it is filtered, amplified, and used to drive a pair of cascaded one-shot multivibrators (not shown). The resulting No. 1 PULSE output signal of No. 1 pulse circuit 128 is a positive going pulse of 1 millisecond duration that corresponds in time to the ignition pulse supplied to the No. 1 igniter 88A (FIG. 3).

Analog section 52A also includes power check circuit 126, which has terminals 126A and 126B connected to Points connector 36 and Engine Ground connector 32, respectively. When power check circuit 126 is activated by the POWER CHECK signal from digital section 52B, it effectively applies a low resistance between Points connector 36 and Engine Ground connector 32. This in effect shorts out circuit interrupter 82 and inhibits the production of a secondary ignition signal to be applied to one of the igniters 88A–88F.

Figure 5:
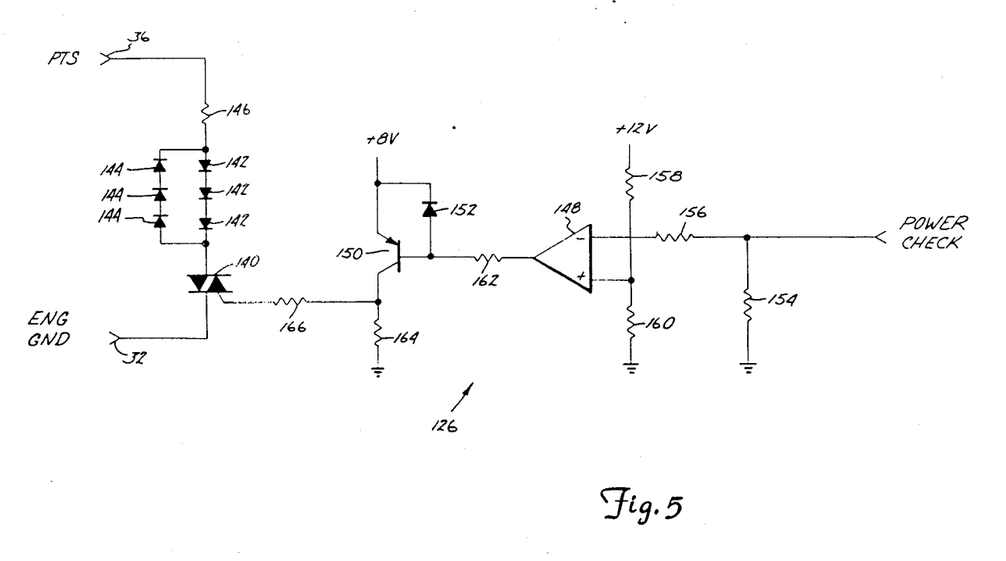
FIG. 5 is an electrical schematic diagram of the power check circuit of the analog section of FIG. 4.

(4) Power Check Circuit 126 (FIG. 5)

FIG. 5 is an electrical schematic diagram of a preferred embodiment of power check circuit 126 of FIG. 4. Power check circuit 126 includes a solid state switching device (triac 140) connected in series with three diodes 142 (or 144) and a small (for example 5 ohm) resistor 146 between Points connector 36 and Engine Ground connector 32. When triac 140 is turned on, it establishes a low resistance path between Points connector 136 and Engine Ground connector 32 to effectively short out circuit interrupter 82 and inhibit production of the secondary ignition signal.

Triac 140 is triggered to a conductive state by a gate signal applied to its gate by a gate circuit which includes amplifier 148, PNP transistor 150, diode 152, and resistors 154, 156, 158, 160, 162, 164 and 166. The POWER CHECK signal from digital section 52B is supplied to the inverting (minus) input of amplifier 148, which compares the POWER CHECK signal to a reference voltage at its noninverting (plus) input which is provided by a voltage divider formed by reistors 158 and 160. When the POWER CHECK signal goes high, the output of amplifier 148 goes low, thus turning on transistor 150. When transistor 150 is turned on, current flows through the emitter-collector current path of transistor 150 and through resistor 166 to the gate of triac 140. This causes triac 140 to be turned on. Once gated to a conductive state, triac 140 continues to conduct as long as the voltage between its two main current carrying electrodes is high enough to maintain current flow.

Although the power check circuit 126 shown in FIG. 5 represents a preferred embodiment of the present invention, other circuits for receiving the POWER CHECK signal from digital section 52B and for providing a low resistance path between Points connector 36 and Engine Ground connector 32 in response to the power check signal have also been used successfully with the present invention. In particular, in other embodiments the solid state switching device is a transistor rather than triac 140. As will be discussed later, when a transistor is used as the switching element, the POWER CHECK signal must remain high for a sufficiently long period to ensure that the transistor does not turn off until after the circuit interrupter 82 is again switched to a conductive state (i.e. points closed). In the embodiment shown in FIG. 5, in which triac 140 is the switching device, the POWER CHECK signal need only be long enough to cause triac 140 to initially turn on, since triac 140 will continue to conduct once it has been triggered by a gate signal until the circuit interrupter 82 switches to a conductive state, thus causing triac 140 to turn off.

Figure 6:
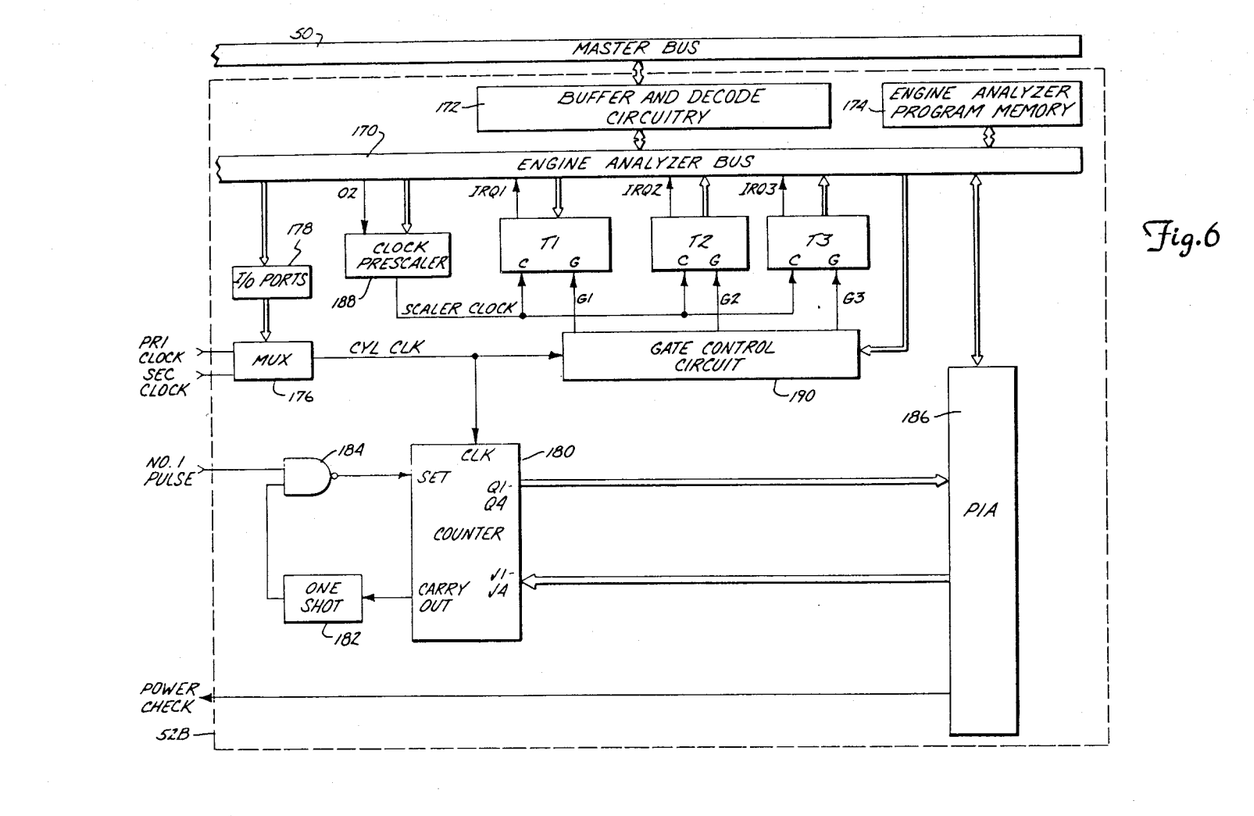
FIG. 6 is an electrical block diagram of a portion of the digital section of the engine analyzer module.

(5) Digital Section 52B (FIG. 6)

FIG. 6 is an electrical block diagram of a portion of digital section 52B of engine analyzer module 52. This portion of digital section 52B relates to the power check test operation, which is the subject of the present invention. Other portions of digital section 52B are described in detail in the previously mentioned copending patent applications, and that description will not be repeated in this application.

In the embodiment shown in FIG. 6, digital section 52B includes engine analyzer bus 170, which includes digital data lines, address lines and control lines. An interface between digital section 52B and the remaining circuitry of engine analyzer 10 is provided by means of master bus 50. Buffer and decode circuitry 172 provides an interface between master bus 50 and engine analyzer bus 170.

The operation of engine analyzer module 52, under the control of microprocessor 48, is based upon a stored engine analyzer program stored in engine analyzer program memory 174. When the operator selects, through user interface 16, a test function (such as power check) involving engine analyzer 52, microprocessor 48 interrogates engine analyzer module 52 to determine that it is present in the system, and addresses engine analyzer program memory 174 for the operating instructions required for that particular test.

Multiplexer 176 receives the PRI CLOCK and SEC CLOCK signals from analog section 52A, and supplies one of these signals as the CYL CLK signal. The particular signal selected by multiplexer 176 is based upon signals from microprocessor 48 which are supplied through engine analyzer bus 170 and I/O ports 178. Although in the subsequent descriptions, the CYL CLK signal shown is based upon the PRI CLOCK signal, it should be understood that for the purposes of the power check test operation of the present invention the SEC CLOCK signal could also be used as the CYL CLK signal.

Each falling edge of the CYL CLK signal waveform is synchronous with the switching of circuit interrupter 82 to a nonconductive state (i.e. the opening of the points or the switching of a solid state circuit interrupter to a nonconductive state). The rising edge of the CYL CLK signal may or may not correspond to a particular engine event, depending upon whether the PRI CLOCK or the SEC CLOCK signal is selected as the CYL CLK signal. In the present invention, however, the timing of the rising edge of the CYL CLK signal is not significant, since it is not used in the timing of the power check test function.

In the power check test function, it is necessary to determine the current cylinder number. Keeping track of cylinder number by using microprocessor 48 is inconvenient, particularly when microprocessor 48 is involved in other functions, such as digitizing waveforms and reconstructing waveforms for display on raster scan display 14. In the embodiment shown in FIG. 6, a cylinder counter circuit which includes presettable counter 180, one-shot 182, and NAND gate 184 performs the cylinder function. Counter 180 is loaded at its jam inputs J1–J4 with the number of cylinders of the engine under test by data supplied from microprocessor 48 through master bus 150, engine analyzer bus 170 and programmable interface adapter (PIA) 186. The number of cylinders of the engine under test is typically supplied to microprocessor 48 through user interface 16.

Counter 180 counts in response to the CYL CLK signal. The current cylinder count is provided at the Q1–Q4 outputs of counter 180, and is supplied through PIA 186 to microprocessor 48.

Counter 180 presets itself to the value at its jam inputs J1–J4 each time an input signal is received at its SET input. Counter 180 receives the CYL CLK signal at its clock (CLK) input. When No. 1 probe 28 is connected to the No. 1 spark plug wire, analog section 52A supplies a No. 1 pulse through NAND gate 184 to the SET input of counter 180, thus synchronizing counter 180 to the operation of the engine. Once counter 180 has been synchronized to the operation of the engine, No. 1 probe 28 can be removed, because one-shot 182 produces a pseudo No. 1 pulse based upon the CARRY-OUT output of counter 180. The pseudo No. 1 pulse is supplied from one-shot 182 through NAND gate 184 to the SET input of counter 180.

Clock prescaler 188 receives data and a clock signal $\phi 2$ from engine analyzer bus 170 which determines a frequency for its SCALER CLOCK output signal. Microprocessor 48 selects, by the scaling factor supplied to clock prescaler 188, either a 1 megahertz frequency of the $\phi 2$ signal or some lower frequency for the SCALER CLOCK signal frequency.

The timing of the power check operation is provided by timers T1, T2 and T3, and gate control circuit 190. Timer T1 is a programmable time delay device which is loaded with a value from microprocessor 48 through engine analyzer bus 170. Timer T1 counts down from the loaded value in response to the SCALER CLOCK signal which is supplied to its clock (C) input. Timer T1 is gated on by a falling edge of a signal G1 which is supplied to its gate (G) input by microprocessor 48 through gate control circuit 190. When timer T1 has counted down to zero, it produces an interrupt signal IRQ1 which indicates to microprocessor 48 that the time delay has ended.

Timers T2 and T3 are used in a mode in which they measure the period of the CYL CLK signal supplied through gate control circuit 190 to their gate inputs. When the falling edge of the CYL CLK signal is detected by timers T2 and T3 at their gate (G2 and G3) inputs, they begin counting in response to the SCALER CLOCK signal supplied to their clock inputs. When the next falling edge is detected, the timers stop counting and generate an interrupt IRQ2 or IRQ3, respectively. The value contained in the counter represents the measured period of the CYL CLK signal.

In the embodiment shown in FIG. 6, two timers T2 and T3 are used and are operated 180° out of phase, so that when timer T2 finishes measuring a period of the CYL CLK signal, timer T3 starts measuring the next period, and vice versa.

Gate control circuit 190 is under the control of microprocessor 48, and allows microprocessor 48 to control whether the gate inputs of timers T1, T2 and T3 will receive the CYL CLK signal. This allows microprocessor 48 to disable and restart timers T1, T2 and T3 as needed.

The POWER CHECK signal is supplied by digital section 52B under the control of microprocessor 48. PIA 186 supplies the POWER CHECK signal to analog section 52A based upon signals from microprocessor 48.

Figure 7:
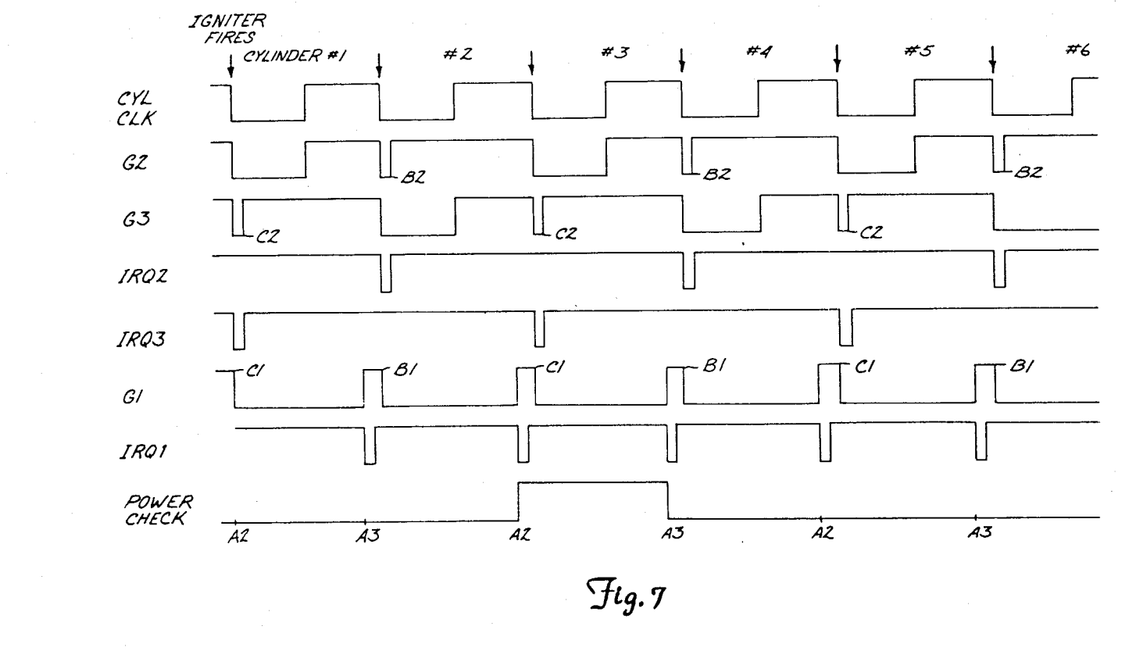
FIG. 7 is a flow diagram illustrating the operation of the microprocessor in a first embodiment of the present invention.
Figure 8:
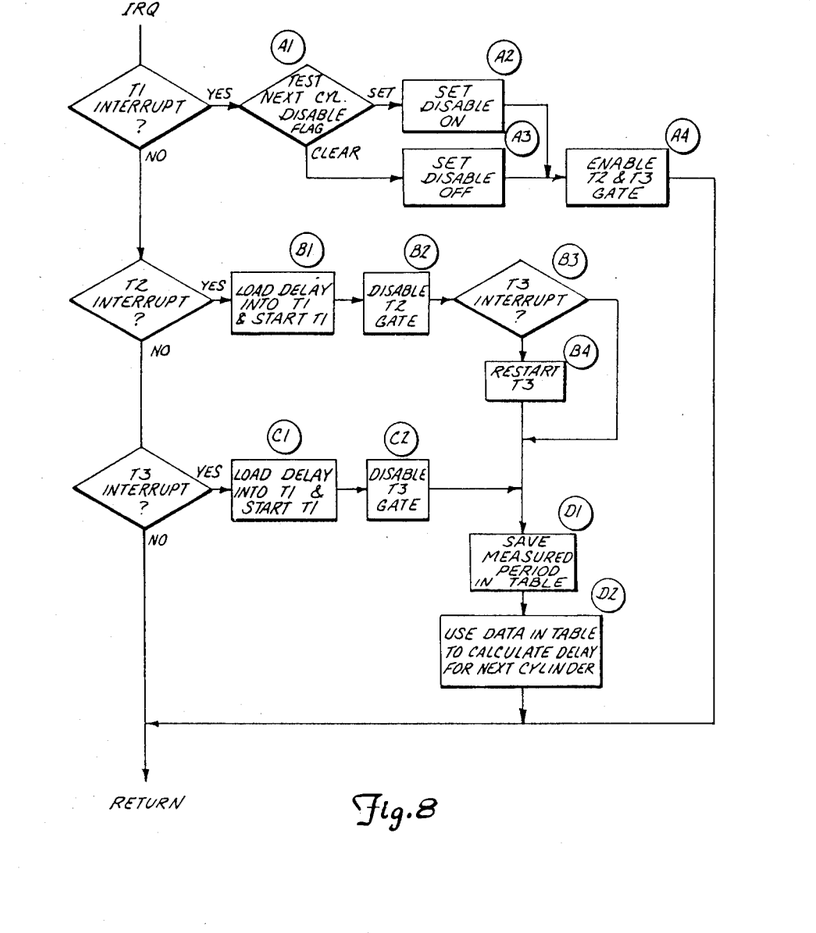
FIG. 8 is a group of waveforms illustrating operation of the first embodiment of the present invention.

(7) Power Check Operation—First Embodiment (FIGS. 7 and 8)

FIGS. 7 and 8 illustrate a first embodiment of the power check apparatus of the present invention. FIG. 7 shows waveforms illustrating operation of the power check test for a six cylinder vehicle. The waveforms which are shown include the CYL CLK signal, gate signal G2 to timer T2, gate signal G3 to timer T3, interrupt IRQ2, interrupt IRQ3, gate signal G1 to timer T1, interrupt IRQ1 and the POWER CHECK signal.

The main power check program which is used by microprocessor 48 to control the power check test function is contained in engine analyzer program memory 174. When the operator has selected the power check test function through user interface 16, microprocessor 48 first determines (by operator selection or program selection) which cylinders are to be disabled in the engine under test. Microprocessor 48 builds and stores a cylinder enable/disable table which contains the status of each cylinder (i.e. whether it is to be enabled or disabled).

All of the actual enabling and disabling of cylinders is done under the control of microprocessor 48 based upon an interrupt program which is illustrated in FIG. 8. The interrupt program uses the previously stored enable/disable table to enable and disable the proper cylinders. The interrupt program is synchronized to the operation of the engine under test through the use of the interrupts generated by timers T1, T2 and T3. In FIG. 8, various steps of the interrupt program are labeled with reference characters A1-A4, B1-B4, C1-C2, and D1-D2. Where appropriate, similar reference characters have been used in FIG. 7 to illustrate when the various steps performed by microprocessor 48 take place.

As shown in FIG. 7, the falling edge of the CYL CLK signal waveform is synchronous with the switching of the circuit interrupter 82 from a conductive to a nonconductive state. This normally corresponds to the firing of an igniter. All timing functions of the power check apparatus of the present invention are derived from the falling edge of the CYL CLK signal. The rising edge of the CYL CLK signal is not utilized.

Signals G2 and G3 are the gate signals to timers T2 and T3, respectively. As discussed previously, times T2 and T3 measure the period of the signal at their gate inputs. When a falling edge is detected on the gate, the timer begins counting. When the next falling edge is detected, the timer stops counting and generates an interrupt. When timer T2 (or T3) generates an interrupt IRQ2 (or IRQ3), microprocessor 48 performs the following steps:

First, microprocessor 48 loads a value corresponding to 7/8ths of the previously measured period for the next cylinder into timer T1 and starts T1 by setting its gate G1 low (step B2 (or C1)).

Second, microprocessor 48 disables timer T2 (or T3) by setting G2 (or G3) high (step B2 (or C2)). Timer T2 (or T3) is disabled because it is the timer which generated the interrupt IRQ2 (or IRQ3).

Third, if timer T2 generated the interrupt IRQ2, microprocessor 48 also checks to see if timer T3 also generated an interrupt IRQ3. If it did, timers T2 and T3 are in phase. In that case, microprocessor 48 restarts timer T3 by raising and lowering its gate signal (step B3). Restarting timer T3 is this case assures that timers T2 and T3 stay 180° out of phase in measuring the cylinder periods. This correction is a safeguard which is seldom required.

Fourth, microprocessor 48 reads the cylinder period just measured from the timer T2 (or T3) which caused the interrupt. Microprocessor 48 stores the measured cylinder period in a table of cylinder period value (step D1).

Fifth, microprocessor 48 uses the data in the measured cylinder period table to calculate the time delay to be loaded into timer T1 when the next interrupt from timer T2 or T3 occurs. This value is saved by microprocessor 48 until it is needed by timer T1. The calculation is made at this time (step D2) in order to minimize the delay in loading timer T1 after an interrupt IRQ2 or IRQ3 from timer T2 or T3, respectively.

In the example shown in FIG. 7, the engine under test is a six cylinder engine. Interrupt IRQ2 from timer T2 is generated at the end of the periods corresponding to cylinders 1, 3 and 5, while interrupt IRQ3 is generated at the end of periods corresponding to cylinders 2, 4 and 6. Thus timer T1 measures the periods of cylinders 1, 3 and 5, while timer T2 measures the periods of cylinders 2, 4 and 6.

Signal G1 is the gate signal to timer T1, which is a programmable time delay timer. Each time timer T2 (or T3) generates an interrupt, microprocessor 48 loads the precalculated time delay value for the next cylinder into timer T1 and then starts timer T1 by lowering its gate signal (step B1 (or C1)). In a preferred embodiment of the present invention, the previously calculated time delay value corresponds to 7/8ths of the previously measured period for the next cylinder. In other embodiments, however, a different fraction can be used, or the time delay can be based upon previously the measured period less a predetermined fixed time increment. In either case, the time delay is less than the expected period of the next cylinder.

Timer T1 delays by the amount of time with which it has been loaded, and then generates interrupt IRQ1. When interrupr IRQ1 occurs, microprocessor 48 performs the following steps:

First, microprocessor 48 sets gate signal G1 high to disable timer T1.

Second, microprocessor 48 checks the cylinder enable/disable table to determine if the next cylinder to be fired should be enabled or disabled (step A1). If that cylinder is to be enabled, the POWER CHECK signal is set low (step A3) and the igniter for that cylinder is allowed to fire. On the other hand, if the next cylinder is to be disabled, the POWER CHECK signal is set high (step A2). Setting the POWER CHECK signal high causes circuit interrupter 82 to be shorted to prevent the igniter for the next cylinder from firing when the circuit interrupter 82 switches from a conductive to a nonconductive state.

Third, timers T2 and T3 are enabled by microprocessor 48 (step A4). This means that the CYL CLK signal is switched to the gates of both timers T2 and T3. One of the two timers (the one currently measuring a cylinder) is already being gated by the CYL CLK signal and will not be changed. The other timer has been disabled by having its gate forced high. It now is ready to begin measuring the next cylinder.

In summary, the power check operation illustrated in FIGS. 7 and 8 utilizes timers T2 and T3 to continually measure the periods of each cylinder of the engine cycle. These periods are saved in a table by microprocessor 48. Each time the CYL CLK signal goes low, a time delay is started in timer T1 which is equal to 7/8ths of what the next cylinder period was on the previous engine cycle. Timer T1 then times out and generates an interrupt to microprocessor 48 just before the next igniter is to be fired. At this time, microprocessor 48 looks into the enable/disable table to see if the next cylinder is to fire or to be inhibited from firing and sets the POWER CHECK signal accordingly.

In the particular example illustrated in FIG. 7, the enable/disable table has indicated that only cylinder No. 3 is to be disabled. As shown in FIG. 7, the POWER CHECK signal is low for all cylinders except for cylinder No. 3. The POWER CHECK signal goes high upon the occurrence of IRQ1 shortly before the falling edge of the CYL CLK signal corresponding to cylinder No. 3. The power check signal remains high until the next occurrence of IRQ1.

The effect of the selective disabling of cylinders is monitored by microprocessor 48 based upon the signals from analog section 52A. For example, microprocessor 48 typically determines the change in rpm of the engine resulting from disabling each cylinder or groups of cylinders. This rpm data can be derived from the stored table of cylinder periods, or from a separate timer (not shown) which is gated by the No. 1 PULSE signal.

Figure 9:
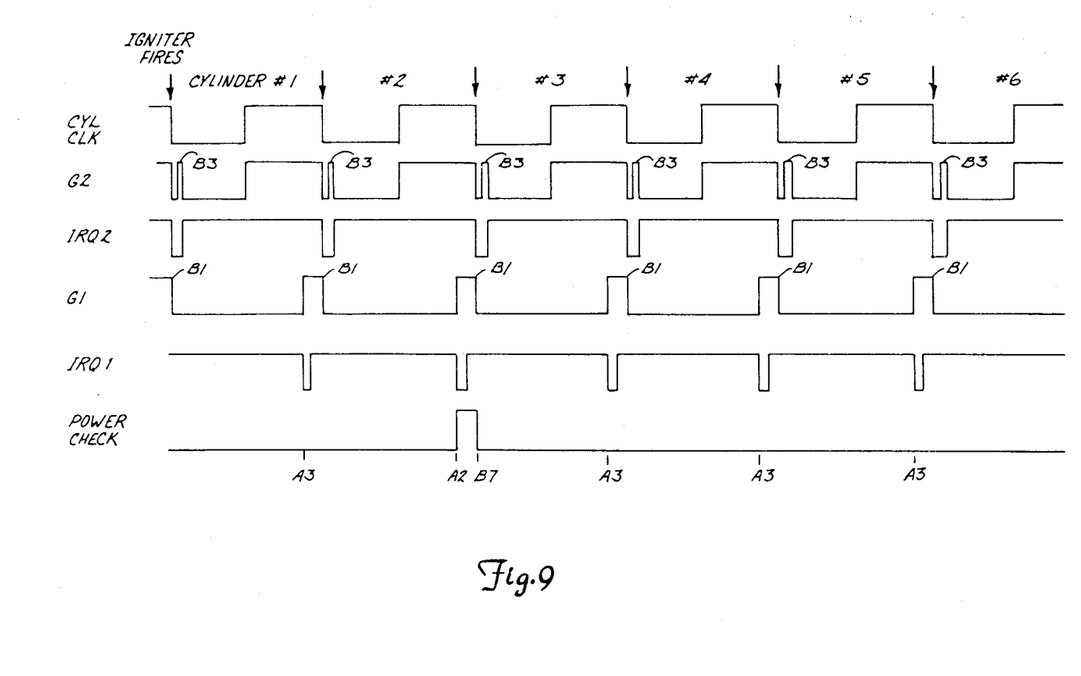
FIG. 9 is a flow diagram illustrating the operation of the microprocessor in a second embodiment of the present invention.
Figure 10:
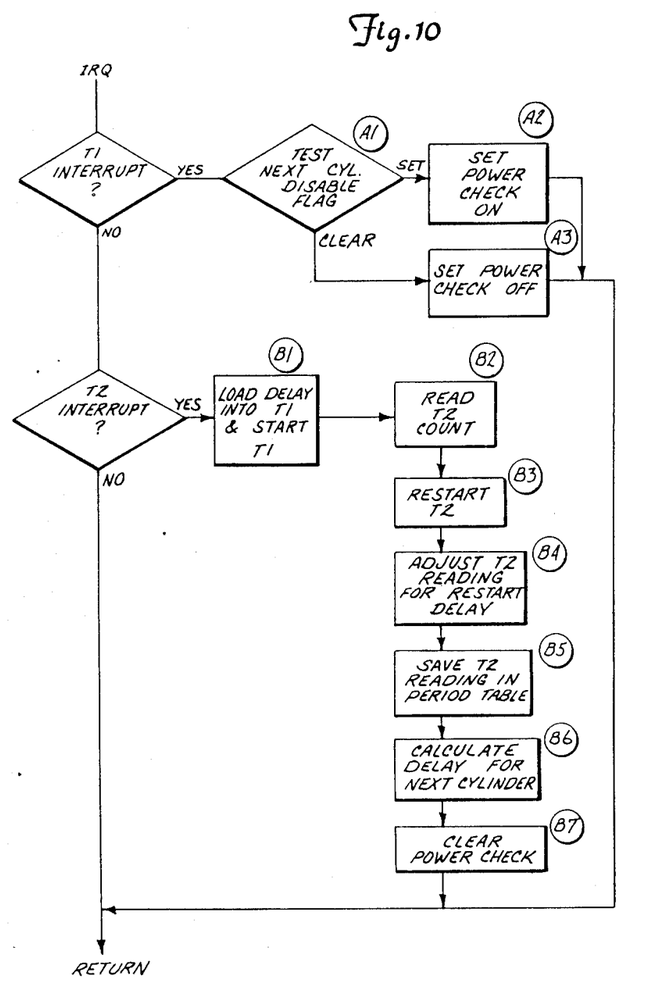
FIG. 10 is a group of waveforms illustrating operation of the second embodiment of the present invention.

(8) Power Check Operation—Second Embodiment (FIGS. 9 and 10).

FIGS. 9 and 10 show another embodiment of the present invention which is simplified in some respects. The basic premise of this simplified second embodiment of the present invention is exactly the same—to anticipate the firing of each cylinder and enable or disable the firing of the igniter to that cylinder based upon flags stored by microprocessor 48 in an enable/disable table.

In this second embodiment, timer T3 is no longer used to measure cylinder periods. All cylinder periods are measured by timers T2. Each time timer T2 completes a period measurement and generates interrupt IRQ2, microprocessor 48 reads the count in timer T2 (step B2) and restarts timer T2 to measure the next cylinder (step B3). Microprocessor 48 adds a constant to each measured cylinder period to compensate for the error caused by restarting timer T2 after the cylinder period has begun.

The operation of timer T1 in the embodiment shown in FIGS. 9 and 10 is exactly the same as illustrated in FIGS. 7 and 8. The other difference between the embodiment shown in FIGS. 9 and 10 and that shown in FIGS. 7 and 8 is that the duration of the POWER CHECK signal when a cylinder is to be disabled is shorter. This is possible because triac 140 remains in a conductive state even after the trigger pulse at its gate is removed. In the embodiment shown in FIGS. 9 and 10, therefore, microprocessor 48 clears the POWER CHECK signal (step B7) after it completes the various steps B1–B6 which it performs as a result of IRQ2.

(9) Conclusion.

The power check apparatus of the present invention provides improved operation by accurately generating POWER CHECK signal pulses with the desired time relationship to the firing of selected cylinders. The present invention takes advantage of the timing and computational capabilities of microprocessor 48 and other digital circuitry to adjust the timing of the POWER CHECK signal pulse to accommodate fluctuations in the various cylinder periods. In addition, the present invention is particularly well suited for automated POWER CHECK testing.

Although the present invention has been described with reference to preferred embodiments, workers skilled in the art will recognize that changes may be made in form and detail without departing from the spirit and scope of the invention.

What is claimed is:

1. An engine test apparatus for use in testing of a multicylinder internal combustion engine by selectively disabling cylinders of the engine while the engine is running to observe its influence on operation of the engine, the engine having an ignition circuit including an igniter for each cylinder, an ignition coil, circuit interrupter means which is periodically switched between a conductive and a nonconductive state to cause the ignition coil to generate a secondary voltage signal each time the circuit interrupter means is switched to the nonconductive state, and a distributor for sequentially applying each generated secondary voltage signal to the igniter of a different cylinder in a predetermined sequence, the engine test apparatus comprising:

switching means for switching from a nonconductive to a conductive state in response to a switch control signal;

connection means for operatively connecting the switching means across the circuit interrupter means to cause the circuit interrupter means to be short-circuited each time the switching means is in its conductive state;

cylinder clock means for deriving from the engine a cylinder clock signal representative of sequential operation of the cylinders of the engine, the cylinder clock signal exhibiting a first signal transition each time the circuit interrupter means switches from its conductive to its nonconductive state;

cylinder counter means responsive to the cylinder clock signal for providing a cylinder count identifying a current cylinder in the sequence;

period measurement means responsive to the cylinder clock signal for measuring a time period for each cylinder;

first storage means for storing previously measured time periods for the cylinders;

time delay means for initiating a time delay in response to each first signal transition of the cylinder clock signal, the time delay having a duration which is determined as a function of and is shorter than a previously measured time period of the current cylinder, so that the time delay ends before the occurrence of the first signal transition corresponding to the next cylinder in the sequence;

second storage means for storing an indication for each cylinder of whether that cylinder is to be disabled by short-circuiting of the circuit interrupter means to prevent generation of a secondary voltage signal for the igniter corresponding to that cylinder;

means for providing the switch control signal at the end of the time delay if based upon the cylinder count and the stored indication, the next cylinder in the sequence is to be disabled.

2. The engine test apparatus of claim 1 wherein the time delay means comprises:

programmable time delay means for providing a time delay of a duration determined by an input value; and means for providing the input value to the programmable time delay means and initiating the time delay, the input value being determined as a function of the previously measured time perod of the current cylinder.

3. The engine test apparatus of claim 2 wherein the means for providing the input value comprises:

program storage means for storing an operating program; and digital processor means for providing signals as a function of the operating program, the cylinder count, the stored measured time periods, and an interrupt signal indicating the occurrence of the first signal transition, the signals provided by the digital processor means including the input value and a gate signal which causes the programmable time delay means to initiate the time delay.

4. The engine test apparatus of claim 3 wherein the period measurement means provides the interrupt signal indicating the occurrence of the first signal transition.

5. The engine test apparatus of claim 4 wherein, in response to the interrupt signal from the period measurement means, the digital processor causes the period measured by the period measurement means to be stored in the first storage means.

6. The engine test apparatus of claim 5 wherein in response to the interrupt signal from the period measurement means, the digital processor means also calculates the input value to be provided after the next interrupt signal from the period measurement means.

7. The engine test apparatus of claim 4 wherein the programmable time delay means provides an interrupt signal at the end of the time delay, wherein the means for providing the switch control signal includes the digital processor means, and wherein the digital processor means provides the switch control signal in response to the interrupt signal from the programmable time delay means as a function of the cylinder count and the stored indication.

8. An engine test apparatus for use in testing of a multicylinder internal combustion engine by selective disabling cylinders of the engine while the engine is running to observe its influence on operation of the engine, the engine having an ignition circuit including an igniter for each cylinder, an ignition coil, circuit interrupter means which is periodically switched between a conductive and a nonconductive state to cause the ignition coil to generate a secondary voltage signal each time the circuit interrupter means is switched to the nonconductive state, and a distributor for sequentially applying each generated secondary voltage signal to the igniter of a different cylinder in a predetermined sequence, the engine test apparatus comprising:

switching means for switching from a nonconductive to a conductive state in response to a switch control signal;

connection means for operatively connecting the switching means across the circuit interrupter means to cause the circuit interrupter means to be short-circuited each time the switching means is in its conductive state;

cylinder clock means for deriving from the engine a cylinder clock signal representative of sequential operation of the cylinders of the engine, the cylinder clock signal exhibiting a first signal transition each time the circuit interrupter means switches from its conductive to its nonconductive state;

cylinder counter means responsive to the cylinder clock signal for providing a cylinder count identifying a current cylinder in the sequence;

programmable time delay means for providing a first interrupt signal at the end of a time delay of a duration determined by an input value;

period measurement means for measuring a time period for each cylinder which ends with the first signal transition of the cylinder clock signal, the period measurement means providing a second interrupt signal when each period measurement is completed;

first storage means for storing a time period table of previously measured time periods for the cylinders;

second storage means for storing an enable/disable table indicating which cylinders are to be enabled and which cylinders are to be disabled;

program storage means for storing an operating program; and digital processor means for providing signals as a function of the operating program, the cylinder count, the time period table, the enable/disable table, and the first and second interrupt signals; wherein in response to the second interrupt signal the digital processor means causes the measured time period to be stored in the time period table, provides the input value to the time delay means and initiates the time delay, the input value being determined by the digital processor means as a function of a measured time period in the time period table so that the time delay produced by the input value ends before the occurrence of first signal transition corresponding to the next cylinder in the sequence; and wherein in response to the first interrupt signal the digital processor means provides the switch control signal as a function of the cylinder count and the enable/disable table.

9. A method of testing a multicylinder internal combustion engine by selectively disabling cylinders of the engine while the engine is running to observe its influence on operation of the engine, the engine being of a type having an ignition circuit including an igniter for each cylinder, an ignition coil, circuit interrupter means which is periodically switched between a conductive and a nonconductive state to cause the ignition coil to generate a secondary voltage each time the circuit interrupter means is switched to the nonconductive state, and a distributor for sequentially applying each generated secondary voltage signal to the igniter of a different cylinder in a predetermined sequence, the method of testing comprising:

deriving from the engine a cylinder clock signal representative of sequential operation of the cylinders of the engine, the cylinder clock signal exhibiting a first signal transition each time the circuit interrupter means switches from its conductive to its nonconductive state;

providing a cylinder count which identifies a current cylinder in the sequence;

measuring a time period for each cylinder;

storing a time period table of previously measured time periods for the cylinders;

storing an enable/disable table indicating which cylinders are to be enabled and which cylinders are to be disabled;

initiating a time delay in response to the occurrence of each first signal transition, the time delay having a duration which is determined as a function of a measured time period in the time period table, the time delay having a duration which is less than the measured time period so that the end of the time delay occurs before the occurrence of the first signal transition corresponding to the next cylinder in the sequence; and short-circuiting the circuit interrupter means of a period beginning with the end of the time delay and continuing at least until the circuit interrupter means switches from its nonconductive state to its conductive state if, based upon the cylinder count and the enable/disable table, the next cylinder in the sequence is to be disabled.

* * * * *